March 9, 1937.  P. H. HUTCHINSON  2,073,305
ARTICLE FEEDING MECHANISM
Filed Sept. 17, 1934   3 Sheets-Sheet 1
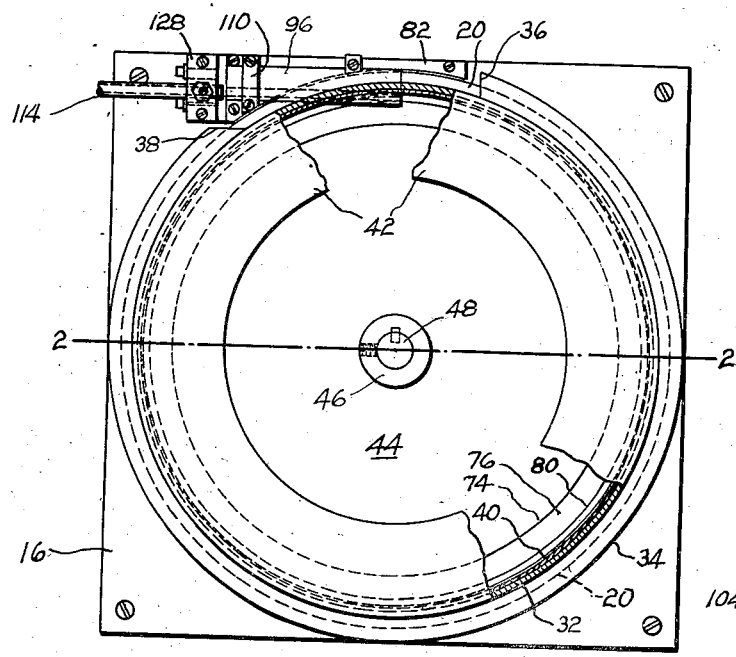
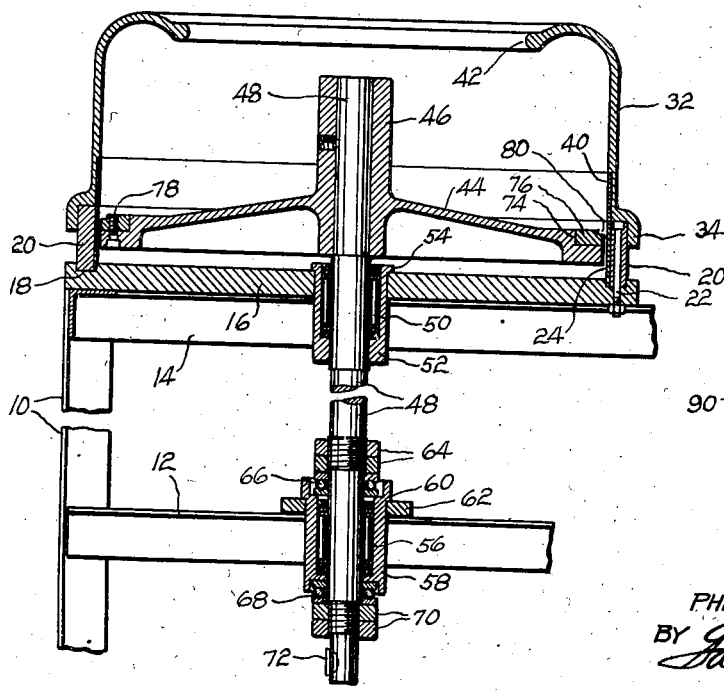
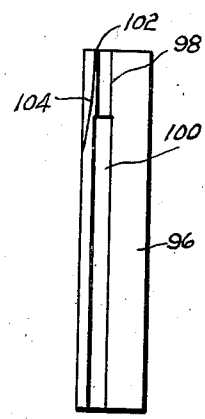
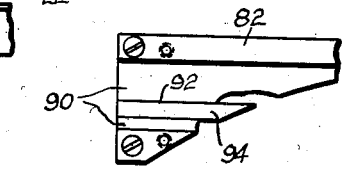
INVENTOR:
PHILIP H. HUTCHINSON,
BY
HIS ATTORNEY.

March 9, 1937.    P. H. HUTCHINSON    2,073,305
ARTICLE FEEDING MECHANISM
Filed Sept. 17, 1934    3 Sheets-Sheet 2
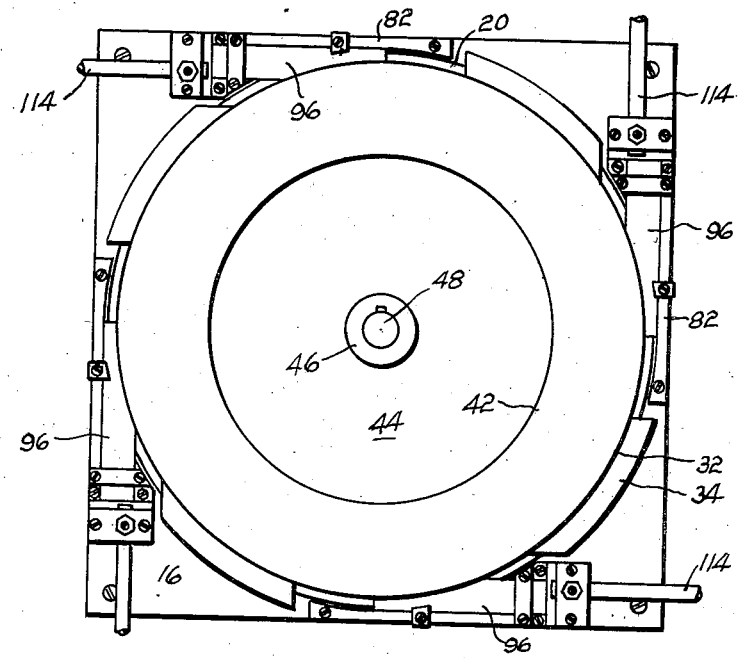
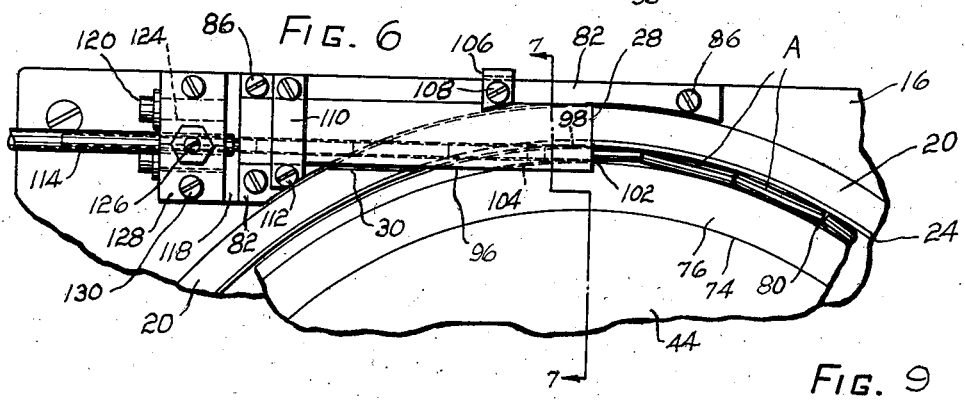
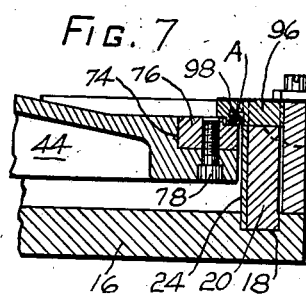 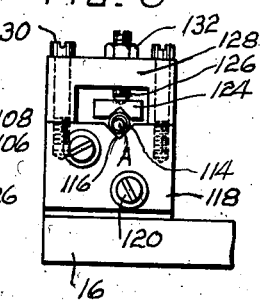 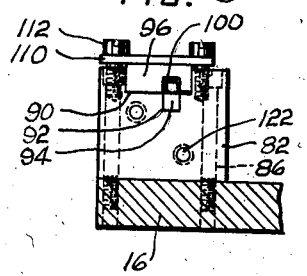
INVENTOR:
PHILIP H. HUTCHINSON,
BY Gales P. Moore
HIS ATTORNEY.

March 9, 1937.　　P. H. HUTCHINSON　　2,073,305
ARTICLE FEEDING MECHANISM
Filed Sept. 17, 1934　　3 Sheets-Sheet 3
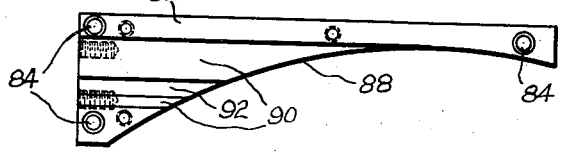
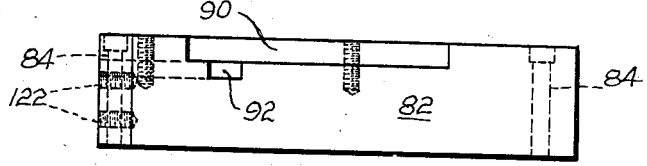
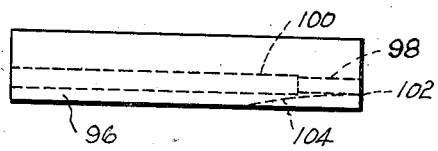 
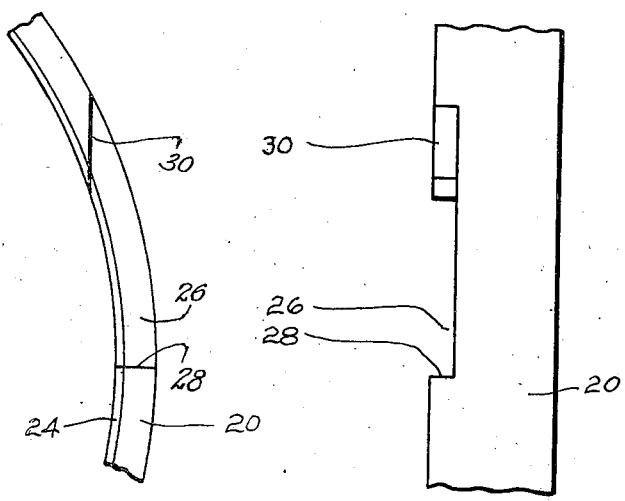 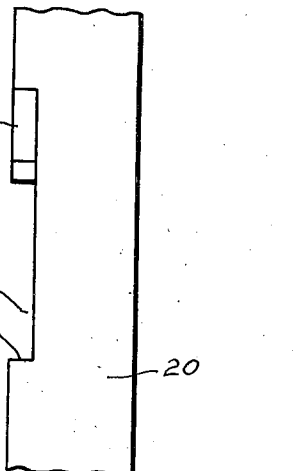
INVENTOR:
PHILIP H. HUTCHINSON,
BY
HIS ATTORNEY Patented Mar. 9, 1937

2,073,305

UNITED STATES PATENT OFFICE 2,073,305

ARTICLE FEEDING MECHANISM

Philip H. Hutchinson, Montclair, N. J., assignor to General Motors Corporation, Detroit, Mich. a corporation of Delaware Application September 17, 1934, Serial No. 744,385

4 Claims. (Cl. 221—136)

This invention relates to article feeding mechanism and comprises all of the features of novelty herein disclosed. An object of the invention is to provide a simple and reliable apparatus for feeding articles in a continuous stream. Another object is to provide a machine for feeding articles from a mass at a high but uniform speed. Another object is to provide an improved machine for arranging elongated articles in end to end relation. Still another object is to provide an improved friction centrifugal feeder.

To these ends and also to improve generally upon devices of this character, the invention consists in the various matters hereinafter described and claimed. In its broader aspects, the invention is not necessarily limited to the specific constructions selected for illustrative purposes in the accompanying drawings in which—

Fig. 1 is a plan view of the apparatus with portions of the hopper side walls broken away and in section.

Fig. 2 is a vertical sectional view taken on the line 2—2 of Fig. 1.

Fig. 3 is a bottom plan view of a throat piece.

Fig. 4 is a plan view of a throat piece holder, a portion of the holder being broken away to better illustrate a wear strip.

Fig. 5 is a plan view of a modification.

Fig. 6 is a plan view to large scale of a portion of the feed mechanism, the cover being removed.

Fig. 7 is a sectional view about on the line 7—7 of Fig. 6, some of the clamping mechanism being omitted.

Fig. 8 is an end view of the outlet tube clamping mechanism.

Fig. 9 is an end view of the throat piece and its holder.

Fig. 10 is a plan view of the throat piece holder.

Fig. 11 is a side view of Fig. 10.

Fig. 12 is a plan view of the throat piece.

Fig. 13 is an end view of Fig. 12.

Fig. 14 is a plan view of a portion of the hopper side wall, and

Fig. 15 is a side view of Fig. 14.

A convenient supporting stand for the improved feeding mechanism is made by vertical angle irons 10 connected, as by welding, to lower horizontal angle irons 12 and upper horizontal angle irons 14, a base plate or table 16 being secured to the latter by screws. The base plate is provided with a circular groove 18 for the lower edge of a circular wall 20 which is held down by bolts 22. A circular wear plate or lining 24 is co-extensive with the wall 20 and also enters the groove 18. Both the wall 20 and its lining 24 are slotted at the upper edge, as at 26 (Figs. 6, 7, 14 and 15), one end of the slot terminating in a radial surface 28 and the other end in a surface 30 which is substantially tangential. It is through this slot 26 that the articles leave the apparatus in a continuous stream. Resting on the wall 20 and removable therefrom is an upper side wall or cover 32 which has a retaining flange 34 fitting the outer periphery of the wall 20, the flange being cut away as indicated at 36 and 38 in Fig. 1 in the neighborhood of the outlet slot 26. The upper side wall or cover 32 has a wear plate or lining 40 around its lower portion, this lining being flush with the lining 24, and the upper edge of the wall 32 has an overhanging rim 42 to prevent spilling of a mass of articles whirling about within the circular confining walls which constitute a feed hopper.

A rotary disc or feed wheel 44 has its hub 46 secured to a vertical drive shaft 48 by a key and set screw and is adapted to provide a rapidly rotating bottom for the hopper. The shaft is journalled in a sealed-up roller bearing 50 in a housing 52 having a supporting flange 54 engaging the table 16. Another sealed-up roller bearing 56 for the lower portion of the shaft is seated in a housing 58 having a supporting flange or shoulder 60 engaging a cross plate 62 connecting the angle irons 12. Nuts 64 are threaded on the shaft, and between them and an internal shoulder in the housing 58 is a supporting ball thrust bearing 66. Another thrust bearing 68 is interposed between a lower pair of nuts 70 and a downwardly facing shoulder of the housing 58. A key 72 provides means for coupling the shaft to any suitable change-speed driving mechanism (not shown).

The disc or feed wheel 44 has a circular step or notch 74 in which a work-locating ring 76 is removably fastened by screws 78. The ring 76 is provided with a circular step or notch 80 at its outer periphery to form, in co-operation with the wear plate 24, a circular channel or trough for elongated articles A. The bottom wall of the notch 80 is at least as high as the outlet slot 26 (Fig. 7) and the width of the notch or trough (Fig. 6) measuring radially from its vertical inner wall to the wear plate 24 depends on the length and diameter or width of the articles A. The width of the notch is so selected that when the two ends of an article engage the wear plate 24, the middle portion will be in tangential relation to the inner vertical wall of the notch. Thus there is no appreciable lateral motion of the articles in the notch but they are free to move endwise therein. The mass of articles in the hopper is whirled about in a circular path while supported on the rotary disc or wheel 44 and they rapidly find their way into the circular notch or trough, aided by centrifugal force and by gravity. There is a resistance to the outermost layers of articles which are frictionally retarded by contact with the lining of the hopper. There is also a resistance to the exit of the articles at the outlet slot 26, because they are not treated or disposed of outside as fast as they can be fed and the remaining mass of articles continues to rotate at a speed in excess of that of the located articles. Thus, improperly located articles do not cause any jam because they are wiped away into the mass of articles by such mass itself. The located articles are constantly urged endwise by their friction against the rapidly rotating surfaces of the locating notch and by the friction of the more rapidly whirling articles above them.

To guide or strip the articles out of the hopper cleanly and without jamming, a throat piece and a holder therefor are provided. The holder 82 has a number of countersunk holes 84 for screw bolts 86 which fasten the holder to the table 16. The holder is wholly outside of the hopper but has an arcuate edge 88 conforming to the outside of the circular wall 20 in the neighborhood of the outlet slot 26. The holder has a wide groove 90 extending tangentially of the hopper with a narrow groove 92 cut down deeper from it. A replaceable wear strip 94 (Figs. 4 and 9) completely fills the groove 92, being driven in, and the articles ride out on its upper surface. A throat-piece 96 fits in the groove 90 and extends through the slot 26 up to the radial surface 28 and close to the tangential surface 30, one corner overlying a portion of the removable ring 76 and its work-locating notch 80. The bottom of the throat-piece has a straight guide channel 98 opening endwise into a guide channel 100 of slightly larger size, both channels being in tangential alignment with the work-locating notch 80 and receiving the articles directly therefrom. Near one corner, the throat piece has an arcuate surface 104 which fits close up to the inner wall of the work-locating notch 80, this arcuate surface 104 terminating in a blade or stripper 102 at the inner side of the channel 98. The outer side of the channel 98 is in tangential alignment with the inner surface of the wear plate 24 so that the advancing ends of the articles, which tend to ride on the wear plate 24 due to centrifugal force, will freely enter the channel 98 without obstruction. The channel 98 is thus composed of inner and outer walls and a connecting top wall so that the channel is closed on three sides but is open downwardly towards the notch 80. The ends of the articles are spaced from the inner wall of the notch 80 so that there is room for the stripper blade 102 to come close to such wall. That end of the throat piece 96 which terminates within the hopper presents an abutment to any articles which stand on end in the notch 80 or lie crosswise thereof and this abutment serves as a fulcrum about which such out-of-position articles are tilted and carried away by the moving mass. The throat piece 96 is clamped in its groove 90 by an angled clip 106 secured by a screw 108 and by a clamp plate 110 secured by screws 112.

The articles pass endwise in a continuous stream from the guide channel 100 into a tube 114 which conducts them to any desired point or machine for treatment, such as for centerless grinding, gauging, inspecting, assembling, etc. The tube 114 rests in a notch 116 of a block 118 which is supported on one end of the holder 82 by screws 120 entering tapped openings 122 in the holder. A clamp plate 124 with a notch in its lower surface also engages the tube 114, being held down by a clamping screw 126 threaded in a saddle or yoke 128 whose legs are fastened by screws 130 to the top of the block 118. The clamping screw 126 is locked in adjusted position by a nut 132. The block 118 is wider than the saddle 128 and its upper edge engages the end of the throat piece 96 to form an end abutment therefor.

The apparatus is particularly adapted to feed elongated articles, that is, articles whose length somewhat exceeds their diameter or width, but balls can also be fed. The entire outer periphery of the disc 44 is available to receive the articles (except a small portion at the throat piece) and centrifugal force tends to make the articles quickly assume the right position to drop into the notch. If an article temporarily stands on end in the notch, it is immediately tilted over by the revolving mass above since the mass is moving faster than the articles in the notch, these last being restrained or slowed up by the articles in the guide channels and tube. There are no projecting parts in the hopper except a thin corner of the throat piece and, if any articles are temporarily obstructed by this, no jamming will occur because they are wiped along or tilted past it by the moving mass. The friction of the rotating surfaces against the located articles is the force tending to advance the articles and this is very uniform so that no interruptions occur in the continuity and speed of the stream of articles urged into the tube. The speed can be reliably varied simply by changing the speed of the rotating shaft and hence great speed of feeding is obtainable when desired. The quick location of the articles is so pronounced and the feed so constant and uniform that several outlets from a single feeding hopper are feasible. This is indicated in Fig. 5 where four throat pieces 96 direct the articles into four separate tubes 114 for treatment by separate machines.

To change from one size of work to another, the work-locating ring 76 is replaced with another having a peripheral notch of proper width, and a differently dimensioned throat piece and a differently sized outlet tube are selected to correspond.

I claim:

1. In a high speed centrifugal feeder, a hopper having a circular side wall, a rotary disc forming the bottom of the hopper and having a circular work-locating notch concentric with the side wall and open upwardly and towards the side wall the side wall having an outlet slot, a throat piece entering the slot and having a portion overlying the work-locating notch, and a stripper blade projecting downwardly from said overlying portion into the notch and lying adjacent to the inner wall thereof; substantially as described.

2. In a high speed centrifugal feeder, a hopper having a circular side wall, a rotary disc forming the bottom of the hopper and having a circular work-locating notch concentric with the side wall and open upwardly and towards the side wall, the side wall having an outlet slot, a throat piece entering the slot and having a guide channel open downwardly towards the notch, the outer wall of the channel being tangent to the inner surface of the side wall, and the inner wall of the channel extending into and being substantially tangent to the inner wall of the notch; substantially as described.

3. In a high speed feeder, a hopper having a side wall, a rotary disc in the hopper and having its upper surface open to the side wall and terminating inside of the latter, the side wall having an outlet slot, a throat piece projecting through the slot and having a longitudinal channel composed of inner and outer side walls and a connecting top wall, the channel thereby being closed on three sides but open to the upper surface of the disc, the outer wall of the channel being tangent to the inner surface of the side wall, and the inner wall of the channel being spaced inwardly from the side wall and overlying the disc; substantially as described.

4. In a high speed feeder, a hopper having a side wall, a rotary disc in the hopper and having its upper surface open to the side wall and terminating inside of the latter, the side wall having an outlet slot, a throat piece projecting through the slot and having a longitudinal channel open to the upper surface of the disc, the outer wall of the channel being tangent to the inner surface of the side wall, the inner wall of the channel being spaced inwardly from the side wall and overlying the disc, and the throat piece also having an abutment adapted to engage out-of-position articles and deflect them from the channel entrance; substantially as described.

PHILIP H. HUTCHINSON.